(12) United States Patent
Zhdanov et al.

(10) Patent No.: US 10,648,530 B2
(45) Date of Patent: May 12, 2020

(54) WEDGED THREE-AXIS INERTIAL SENSOR DAMPER-SUSPENSION

(71) Applicant: TOPCON POSITIONING SYSTEMS, INC., Livermore, CA (US)

(72) Inventors: Alexey Vladislavovich Zhdanov, Moscow (RU); Alexander Vladimirovich Osipov, Moscow (RU); Anton Gennadievich Golovanov, Moscow (RU); Kirill Valerievich Isaev, Moscow (RU); Sergey Vlktorovich Rogachkov, Moscow (RU)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 0 days.

(21) Appl. No.: 16/497,871

(22) PCT Filed: Feb. 8, 2018

(86) PCT No.: PCT/RU2018/000077
§ 371 (c)(1),
(2) Date: Sep. 26, 2019

(87) PCT Pub. No.: WO2019/156585
PCT Pub. Date: Aug. 15, 2019

(65) Prior Publication Data
US 2020/0102999 A1 Apr. 2, 2020

(51) Int. Cl.
  *F16F 15/04* (2006.01)
  *F16F 1/36* (2006.01)
  *F16F 7/10* (2006.01)
(52) U.S. Cl.
  CPC ............ *F16F 15/04* (2013.01); *F16F 1/3605* (2013.01); *F16F 7/1028* (2013.01)

(58) Field of Classification Search
  CPC ......... F16F 15/04; F16F 1/3605; F16F 7/1028
  USPC ......................................................... 73/11.09
  See application file for complete search history.

(56) References Cited

U.S. PATENT DOCUMENTS

| | | | |
|---|---|---|---|
| 8,152,145 B2* | 4/2012 | Anderson | F16F 1/361 188/267.2 |
| 9,409,765 B1* | 8/2016 | Desai | B81B 7/0058 |
| 2007/0113702 A1* | 5/2007 | Braman | F16F 15/08 74/574.4 |

OTHER PUBLICATIONS

International Search Report and Written Opinion dated Nov. 15, 2018, in connection with International Patent Application No. PCT/RU2018/000077, 6 pgs.

* cited by examiner

*Primary Examiner* — Tarun Sinha
(74) *Attorney, Agent, or Firm* — Chiesa Shahinian & Giantomasi PC

(57) ABSTRACT

A wedge three-axis inertial sensor damper suspension apparatus prevents shock and vibration impacts on a construction machine from being transferred to inertial sensors used by an automatic control system of the construction machine. The inertial sensor suspension apparatus includes a pocket, a lid, a core disposed in the pocket and covered by the lid, one or more inertial sensors attached to the core, a plurality of elastomer insertions attached to the core and forming an upper wedge between the core and the lid and a lower wedge between the core and the pocket, and a coupler that provides controlled connection of the pocket and the lid to compress the plurality of elastomer insertions using a force corresponding to a target resonance frequency for the inertial sensor suspension apparatus.

20 Claims, 11 Drawing Sheets

WEDGED THREE-AXIS INERTIAL SENSOR DAMPER-SUSPENSION

CROSS-REFERENCE TO RELATED APPLICATIONS

This application is a National Stage under 35 U.S.C. 371 of PCT/RU2018/000077, filed Feb. 8, 2018, the entire content of which is incorporated herein by reference.

TECHNICAL FIELD

The present invention relates generally to an inertial sensor suspension apparatus for construction equipment and, more particularly, to a mount wedged three-axis inertial sensor damper-suspension apparatus to prevent vibration and shock impacts from a construction machine being transferred to inertial sensors.

BACKGROUND

Automatic control systems are widely used in construction machines. The use of automatic control systems in construction machines improves the accuracy of work performed using construction machines, cuts fuel and construction material consumption, brings down skill requirements for operating construction machines, and reduces fatigue of construction machine operators. For example, automatic control systems are used to control grader and bulldozer blades, asphalt and concrete pavers, and excavator buckets. Such automatic control systems are typically used to hold the operative organ of the machine at a desired height to track a design project. To estimate the current height of the operative organ, different sensors are employed, such as Global Navigation Satellite System (GNSS) sensors, laser sensors, ultrasonic sensors, etc. The drawbacks of such sensors include infrequent update rate, delay in response time, and poor short-term stability. To solve these issues, the sensors are often integrated with inertial sensors, such as angular rate sensors (gyroscopes) and/or accelerometers, installed on the machine.

Unfortunately, construction machines are subject of shock and vibration impacts with high level amplitudes that are caused by the working movements of the construction machines, and such impacts negatively affect the inertial sensors. This problem is particularly prevalent for bulldozers and excavators. The impacts are often caused by stones either hitting a blade or bucket or falling into a vehicle's base mounting (for example, between a track and rollers). Similar impacts can also be caused by a hydraulic rod, if there is an air gap at the pivot point to the blade. Rollers themselves moving on tracks (especially at the point of track shoes connection) also create vibration impact. The influence of such impacts, especially in the 1 kHz or higher frequency range, negatively affects the proof mass stability, which is a measuring element of inertial sensors of micromechanical types (e.g., MEMS—micro electro mechanical system). This is the micromechanical sensor (MEMS sensor) that is the most widely utilized due to its high accuracy, reliability, compactness, and low cost.

Shock and vibration impacts on the construction machine can result in errors in a sensor's output signal. Fortunately, sensors have a selectivity to impact frequencies. There are frequencies to which the proof mass is sensitive and frequencies to which the proof mass is insensitive. Both accelerometers and gyroscopes are built on the basis of a mechanical oscillating/vibrational circuit with some internal frequencies. If in the spectrum, there are harmonics equal to the resonance frequency, an error is generated. It is desirable that such frequencies need to be mechanically filtered. Accordingly, a shock absorption system that prevents impacts of such frequencies from being transferred to the sensor is desirable.

BRIEF SUMMARY OF THE EMBODIMENTS

In accordance with various embodiments, a three-axis inertial sensor damper suspension apparatus is provided that acts as a mechanical filter and prevents shock and vibration impacts on a construction machine from being transferred to one or more inertial sensors used by an automatic control system of the construction machine.

In accordance with one embodiment, an inertial sensor suspension apparatus that is mountable on a construction machine for preventing impacts on the construction machine from being transferred to one or more inertial sensors comprises a pocket, a lid, a core disposed in the pocket and covered by the lid, one or more inertial sensors attached to the core, a plurality of elastomer insertions attached to the core and forming an upper wedge between the core and the lid and a lower wedge between the core and the pocket, and a coupler that provides controlled connection of the pocket and the lid to compress the plurality of elastomer insertions using a force corresponding to a target resonance frequency for the inertial sensor suspension apparatus.

In accordance with another embodiment, a system comprises a construction machine having an operative organ, one or more inertial sensors configured to measure at least one of acceleration or angular rate of the operative organ of the construction machine, and an inertial sensor suspension apparatus for preventing impacts on the construction machine from being transferred to the one or more inertial sensors, the inertial sensor suspension apparatus. The inertial sensor apparatus comprises a pocket, a lid, a core disposed in the pocket and covered by the lid, wherein the one or more inertial sensors are attached to the core, a plurality of elastomer insertions attached to the core and forming an upper wedge between the core and the lid and a lower wedge between the core and the pocket, and a coupler that provides controlled connection of the pocket and the lid to compress the plurality of elastomer insertions using a force corresponding to a target resonance frequency for the inertial sensor suspension apparatus.

These and other advantages of the embodiments will be apparent to those of ordinary skill in the art by reference to the following detailed description and the accompanying drawings.

DETAILED DESCRIPTION

Figure 1:
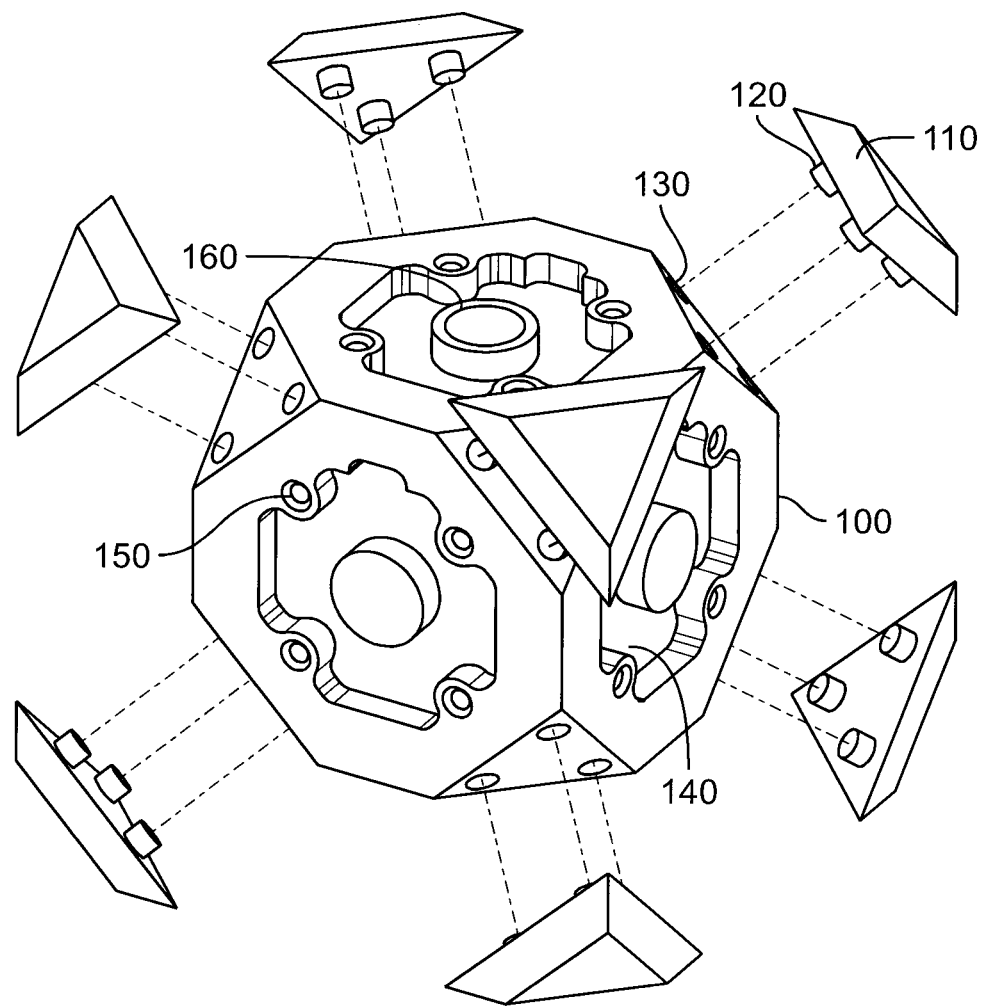
FIG. 1 illustrates a cubic-shaped core having elastomer inserts installed on the core's corners according to an embodiment of the present invention.

In accordance with various embodiments, a three-axis inertial sensor damper suspension apparatus is provided that acts as a mechanical filter and prevents shock and vibration impacts on a construction machine from being transferred to one or more inertial sensors used by an automatic control system of the construction machine.

According to an embodiment of the present invention, the three-axis inertial sensor damper suspension system utilizes the principle of a passive mechanical oscillating system, and includes a heavy metal core with inertial sensors fixed to its face. The core can be cubic shaped. All the eight cube corners are pyramidal-truncated, with the elastomer layer being placed onto them. Latex rubber or silicon rubber with a low factor of residual deformation (compression set) can be used as the elastomer. The elastomer serves as a spring to produce oscillations and a damper to further attenuate those oscillations (two-in-one). The elastomer is initially pressed/strained with a certain force to provide a desired resonance frequency of the suspension. The resonance frequency is determined from an amplitude-frequency response (AFR) used for describing characteristics of an oscillating system and efficiency of a suspension system in suppressing shock and vibration impacts. The parameter components of the suspension can be calculated and then specified in testing on a vibration work bench. This allows the AFR to be estimated, such that the AFR meets the requirements on resonance frequency, and proves the suppression efficiency of the suspension system.

In an advantageous embodiment, the core is inserted vertically down into a pocket (gap), in which bottom angles are formed as counterparts to the four truncated corners of the bottom of the core. The cubic core and the pocket are closed by a lid, and on the bottom side of the lid there are also angles formed as counterparts to the four truncated corners on the top of the core. The lid can be screwed by a central coupling screw at a target moment controlled by a torque screwdriver. The lid and coupling screw can then be locked by side screws (counter screws). It is to be understood that directions up, down, vertical are conditional and relative to the core and the three-axis suspension system and are used herein for descriptive purposes. The three-axis suspension system can be used at arbitrary orientations in a construction machine and efficiently works at any direction of shock impact and vibration effects.

According to an advantageous aspect of the present invention, the top and bottom truncated corners of the core, as well as their counterparts in the pocket and lid serve as a wedge system. The vertical force of the central coupling screw is transferred into a hold-down/clamping pressure on the elastomer corners. The resonance frequency is proportional to the pressure, the pressure is proportional to the screw force, and finally the screw force is proportional to the torque moment. The torque moment thus defines suspension's resonance frequency. Accordingly, torque moment can be controlled to achieve a target resonance frequency of the suspension system in control the AFR of the suspension system to mechanically filter shock and vibration impacts so as not to transfer the impacts to the inertial sensors.

FIG. 1 illustrates a cubic-shaped core having elastomer inserts installed on the core's corners according to an embodiment of the present invention. As illustrated in FIG. 1, a three-axis inertial sensor damper suspension apparatus includes a core 100 and eight insertions 110. The core 100 can be shaped as a cube with pyramidal-truncated corners, as shown in FIG. 1. The insertions 110 are respectively installed onto the truncated cube corners of the core 100. It is to be understood that although only one of the insertions 110 is numbers as "110" in FIG. 1 for sake of clarity, the description of the insertions 110 herein applies similarly to the insertions installed at all of the corners of the core 100. The same approach is used for other elements in the figures as well.

The core 100 is advantageously made from a high density material that provides a heavy weight relative to the size of the core 100. For example, the core can be made from stainless steel, brass, or bronze, but the present invention is not limited thereto. The insertions 110 are made of an elastomer with a low stiffness ratio, low property change within an industrial temperature range (e.g., −40 . . . +85° C.), and low residual deformation i.e. low material shape changes after removing force impact. In an advantageous embodiment, the elastomer used for the insertions 110 is natural rubber (latex) or a type of silicon rubber. Aligning pins 120 are formed on the underside of each insertion 110. Aligning pins 120 on the underside of each insertion 110 are inserted into corresponding holes 130 in the truncated corners of the core 100 and held in place in the corresponding holes 130 by friction during assembly. On each of the six faces of the core 100, recesses 140 and holes 150 are formed to fasten printed circuit boards (PCBs) with inertial sensors. The core 100 also includes a tubular central opening 160 that passes through the top and bottom faces of the core 100. The central opening 160 passes through the top and bottom faces of the core and forms a hollow channel through the center of the core 100.

Figure 2:
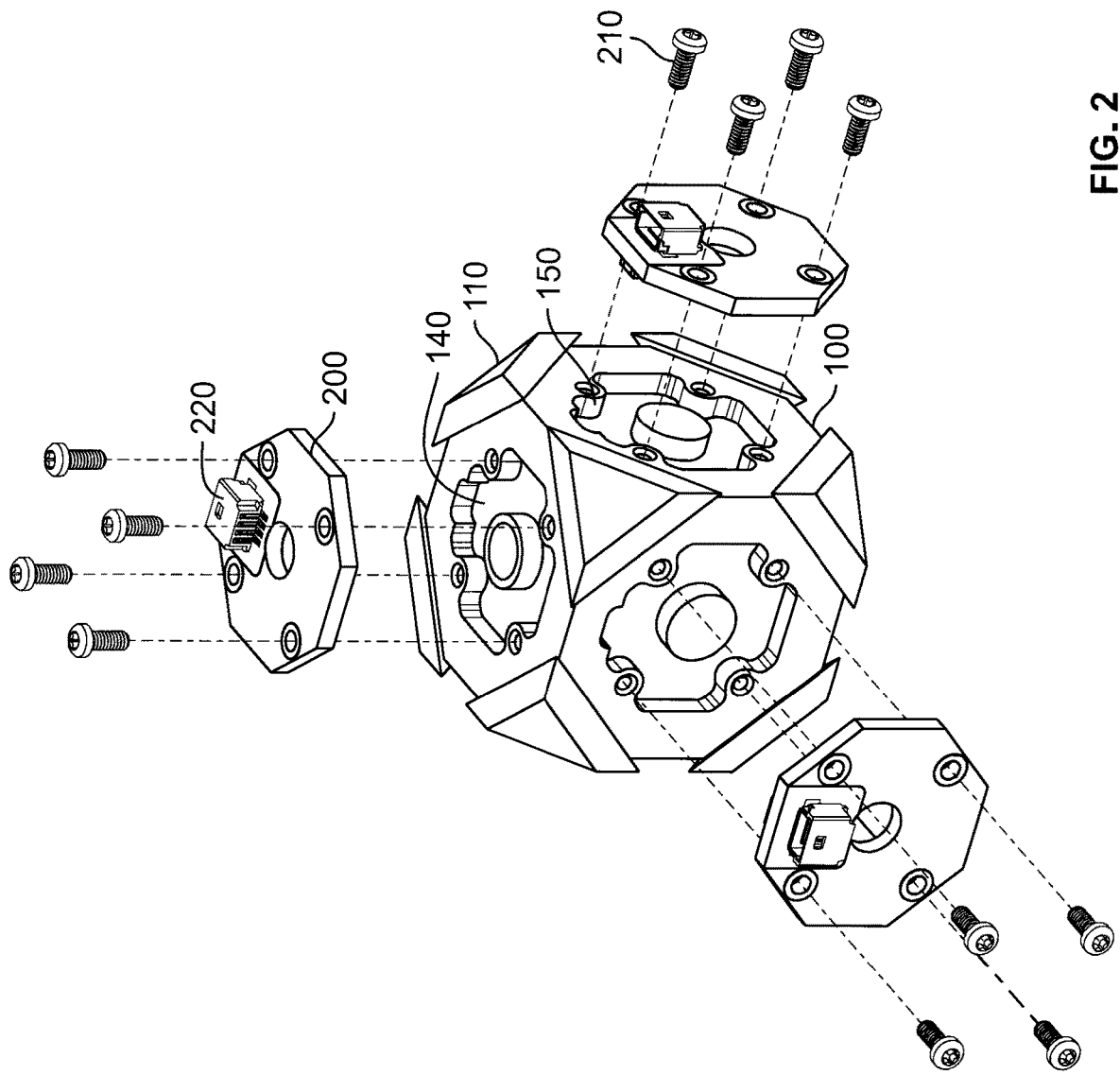
FIG. 2 illustrates installation of PCB with inertial sensors onto faces of the core.

FIG. 2 illustrates installation of PCB with inertial sensors onto faces of the core 100. As illustrated in FIG. 2, boards 200 with inertial sensors are installed on a number of the faces of the core 100. The holes 150 in the faces of the core 100 can be threaded screw holes, and the boards 200 can be installed on the faces of the core 100 with recesses 140 by tightening screws 210 through holes in the boards 200 and into the screw holes 150 in the faces of the core 100. The boards 200 are printed circuit boards (PCBs) with inertial sensors. Each board 200 has a connector 220 to output electrical signals from the inertial sensors and to input and provide power to the board 200. The connector 220 on each board 200 can connect to a computer system of a construction machine. The computer system of the construction machine provides power to the boards 200 via the connectors 220 and receives electrical signals providing measurements of the inertial sensors output by the connectors 220. Both digital and/or analog inertial sensors can be used on board 200. Analog sensors typically output analog voltage or current via connector 220. This signal is then digitized by means of an analog to digital converter (ADC). Digital sensors have an ADC inside the chip and output a digital pulse signal on connector 220 according some standard digital interface, e.g., serial peripheral interface (SPI), I2C, etc. A digit from the ADC represents an actual physic value (acceleration, angular rate) and is further processed in central processor unit (CPU) of computer system according a target math processing algorithm. Depending on the type and number of the inertial sensors, there can be one, two, three, or more boards 200 installed on respective faces of the core 100. In an advantageous embodiment shown in FIG. 2, three identical boards 200 are installed on respective faces of the core, with a single axial inertial sensor installed on each board 200. Together, the three boards 200 provide three-axis measurements (XYZ) generating a full-scale vector of angular rate or acceleration. The use of such a vector is a standard approach in integrating inertial sensors with different sensors. For example, a typical target math algorithm to couple inertial and GNSS positioning data can be based on a Kalman Filter (KF) approach. The three boards 200 need to be installed on orthogonal planes (i.e., the angle between the planes is 90°). Accordingly, as shown in FIG. 2, the three boards 200 are installed on three orthogonal faces of the core 100. The use of three boards 200 with uniaxial inertial sensors installed on three orthogonal faces of the core 100 provides a three-axis, centrally-symmetrical suspension system that is efficient in all of the three axes.

In other possible embodiments, two-axial inertial sensors, or a three-axial inertial sensor can be used. In such embodiments, the number of boards 200 can be correspondingly reduces. For example, in a case in which two-axis inertial sensors are used, two boards 200 can be installed on respective faces of the core 100. In a case in which, a three-axis inertial sensor is used, one board 200 can be installed on a face of the core 100.

Figure 3:
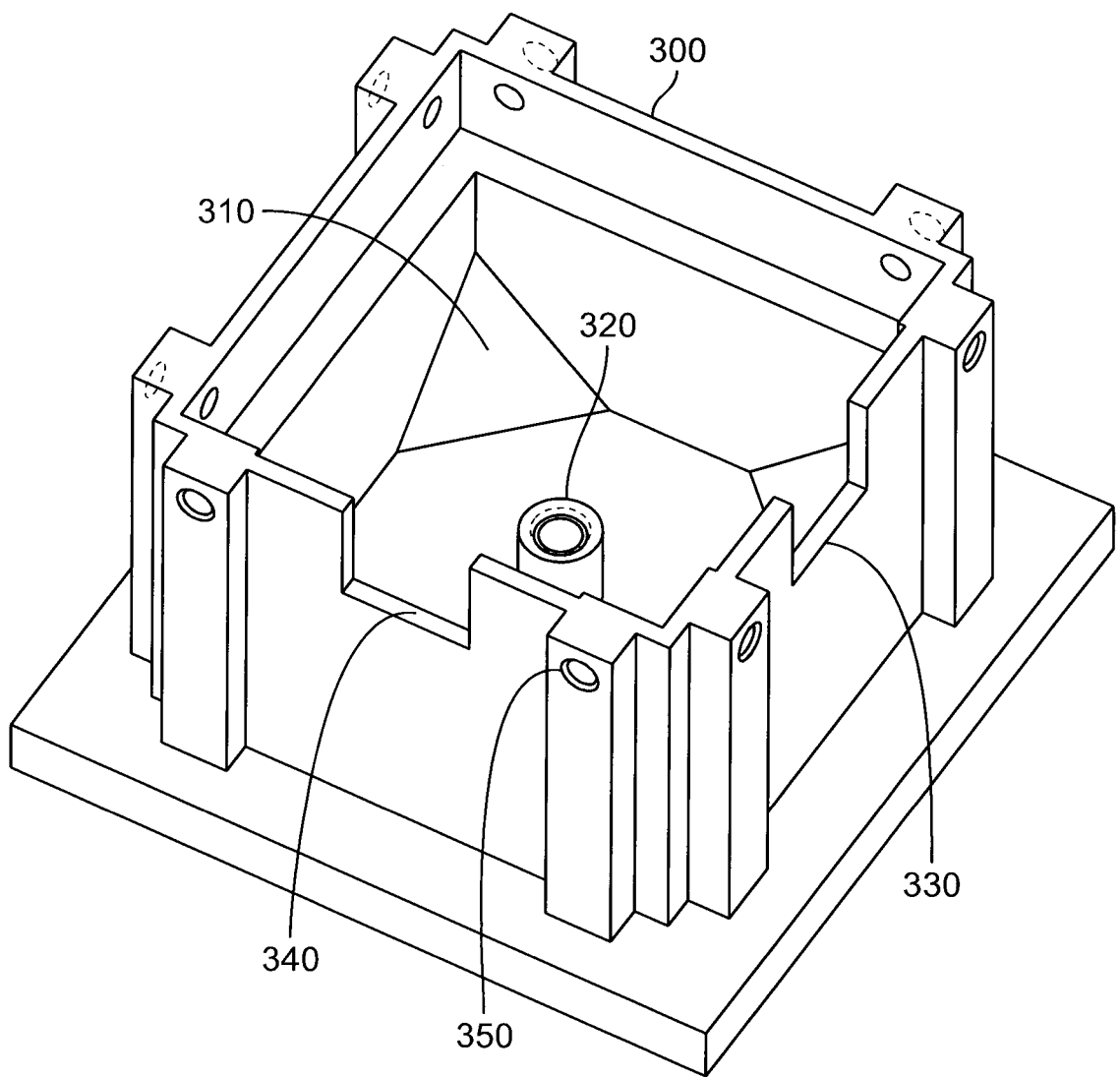
FIG. 3 illustrates a pocket in which the core is placed according to an embodiment of the present invention.

FIG. 3 illustrates a pocket 300 in which the core 100 is placed according to an embodiment of the present invention. As shown in FIG. 3, bottom internal corners of the pocket 300 are formed with counterparts 310 to the insertions 110 installed on the truncated corners of the core 100. The counterparts 310 formed in the bottom internal corners of the pocket 300 are pyramidal shaped and correspond to the shape of the insertions 110 installed on the pyramidal-truncated corners of the core 110, such that a flat triangular surface of a corresponding insertion 110 rests on a triangular surface of each counterpart 310. As shown in FIG. 3, there are four counterparts 310 corresponding to the insertions 110 on the four bottom corners of the cubic-shaped core 100. A threaded boss 320 is installed at the center of the bottom internal surface of the pocket 300. The threaded boss 320 provides a threaded hole in which a screw can be tightened. The sides of the pocket 300 that correspond to faces of the core 100 on which boards 200 with inertial sensors are installed are formed with windows 330 and 340 that allow wires to run to/from the connectors 220 of the boards 200. The windows 330 and 340 are cutouts in the sides of the pocket 300 that accommodate the connectors 220 of the boards 200 so wires can be connected to the connectors 220 when the core 100 is installed within the pocket 300. Each side of the pocket is formed with threaded holes 350. In the embodiment of FIG. 3, two threaded holes 350 are provided on each side of the pocket 300 for a total of eight threaded holes 350. The general requirement for the pocket 300 is mechanical strength, and there are no specific requirements to its weight (compared to the core 100). In an exemplary embodiment, the pocket 300 can be produced using an aluminum alloy by a die casting method.

Figure 4:
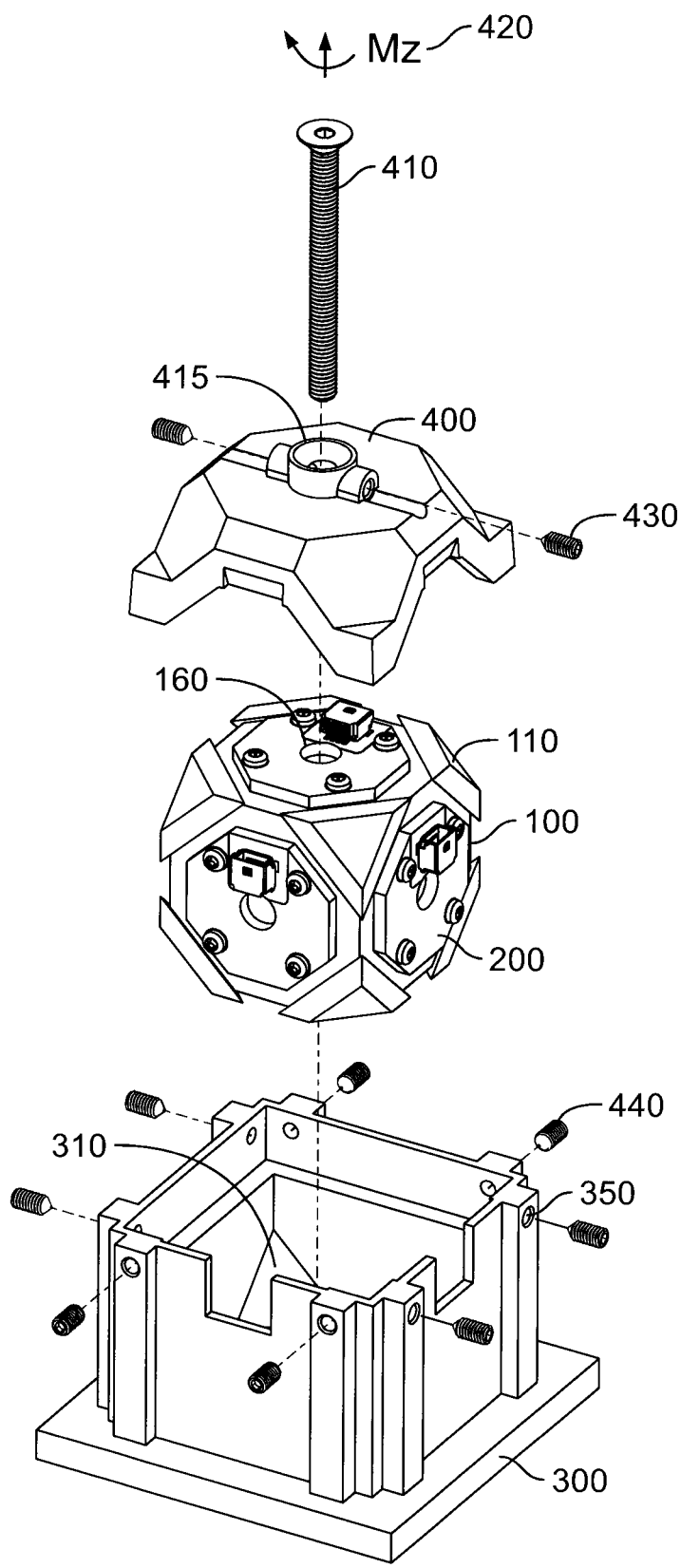
FIG. 4 illustrates assembly of the three-axis inertial sensor damper suspension apparatus according to an embodiment of the present invention.

FIG. 4 illustrates assembly of the three-axis inertial sensor damper suspension apparatus according to an embodiment of the present invention. As shown in FIG. 4, the core 100 with the installed insertions 110 and boards 200 is placed into the pocket 300 and covered by a lid 400. The lid 400, like the pocket 300, can be made of an aluminum alloy. A bottom flange formed by the insertions 110 on the four bottom corners of the core 100 lies on the corresponding counterparts 310 formed in the bottom internal corners of the pocket 300. The lid 400 is formed with four counterparts in the internal corners of the bottom side of the lid. The counterparts of the lid are similar to the counterparts 310 in the pocket 300. The four counterparts of the lid 400 correspond to the insertions 110 installed on the four upper corners of the core 100. The counterparts of the lid 400 cover an upper flange formed by the insertions 110 on the four upper corners of the core 100. The lid 400 is formed with a central opening 415 that aligns with the central opening 160 of the core 100 when the lid 400 covers the core 100. The threaded boss 320 of the pocket also aligns with the central opening 160 of the core 100 when the core 100 is placed in the pocket 300. A coupling screw 410 passes through the central opening 415 of the lid 400 and the central opening 160 of the core 100 and is screwed into the threaded boss 320. The moment ($M_Z$) 420 of tightening coupling screw 410 is controlled by a torque screwdriver. In particular, the moment 420 of coupling screw 410 is controlled to be equal to a specific value defining a target spring factor K of the suspension. Once coupling screw 410 is tightened and controlled to have a specific desire moment 420, screws 430 are tightened to lock coupling screw 410 to prevent spontaneous twisting (screwing or unscrewing) of screw 410. This locks coupling screw 410 at the desired moment 420, which keeps the spring factor of the suspension at the target spring factor K. As shown in FIG. 4, screws 430 are tightened through threaded holes in the lid formed perpendicular to the central opening 415 to lock coupling screw 410. Then, screws 440 are tightened through threaded holes 350 of the pocket 300 to lock the lid 400 into the pocket and prevent spontaneous movements of the lid 400. For example, eight screws 440 are used to lock the lid 400 in the embodiment of FIG. 4. Spontaneous movements of the lid can be caused by random impacts resulting in generating large moments of impulse due to the considerable weight of the core 100. This may result in the lid 400 being displaced and a single coupling screw 410 will not typically be enough to prevent displacements of the lid 400.

Figure 5:
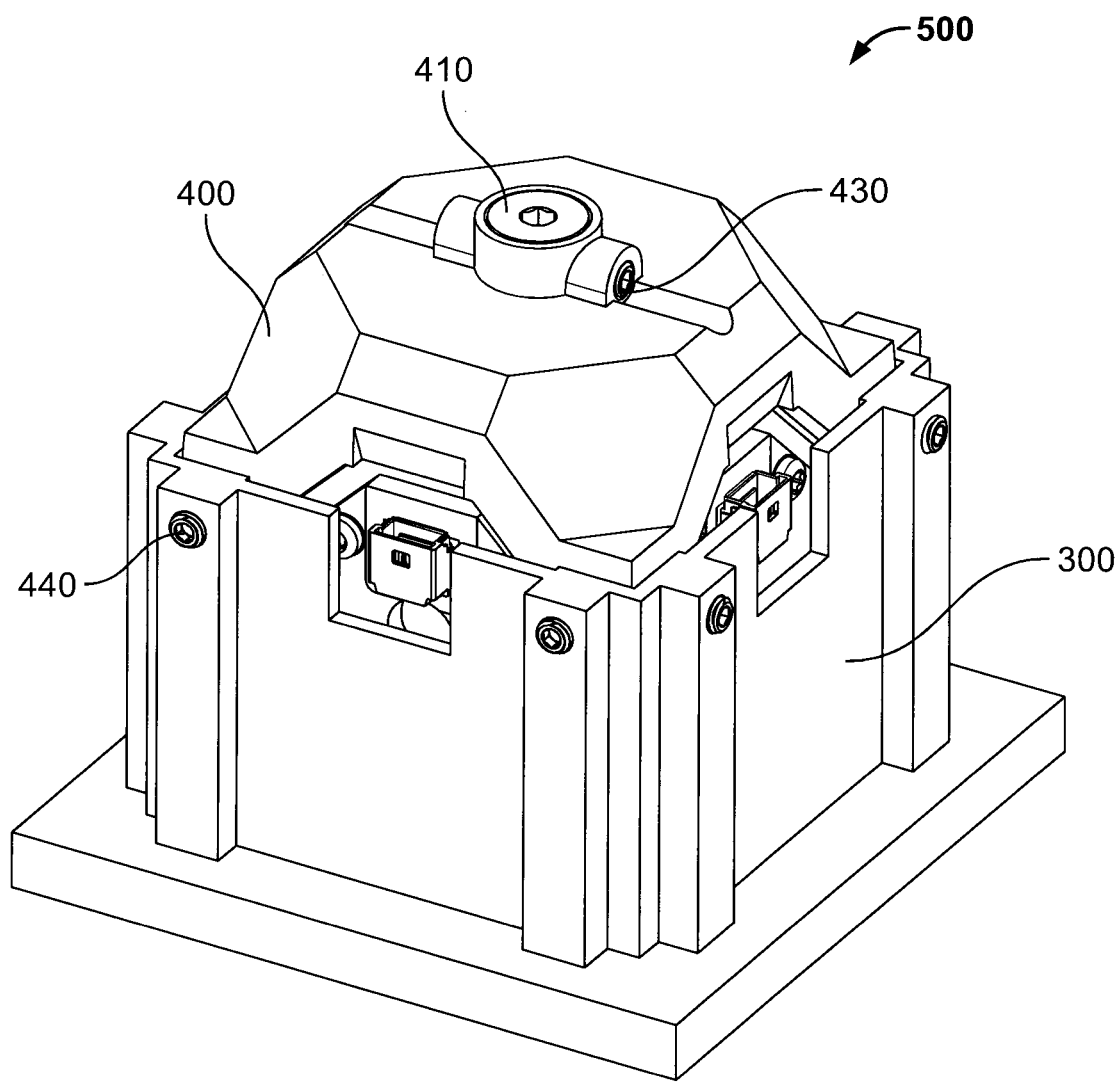
FIG. 5 illustrates an assembled a three-axis inertial sensor damper suspension apparatus 500 according to an embodiment of the present invention.

FIG. 5 illustrates an assembled a three-axis inertial sensor damper suspension apparatus 500 according to an embodiment of the present invention. In the assembled suspension apparatus 500, the core 100 is placed within the pocket 300 and covered by the lid 400. Coupling screw 410 passes through the central opening 415 of the lid 400 and the central opening 160 of the core 100 and tightened into the threaded boss 320 of the pocket 300 to a specific desired moment 420. Coupling screw 410 is locked into place by screws 430, and the lid 400 is locked into place in the pocket 300 by screws 440.

Figure 6A:
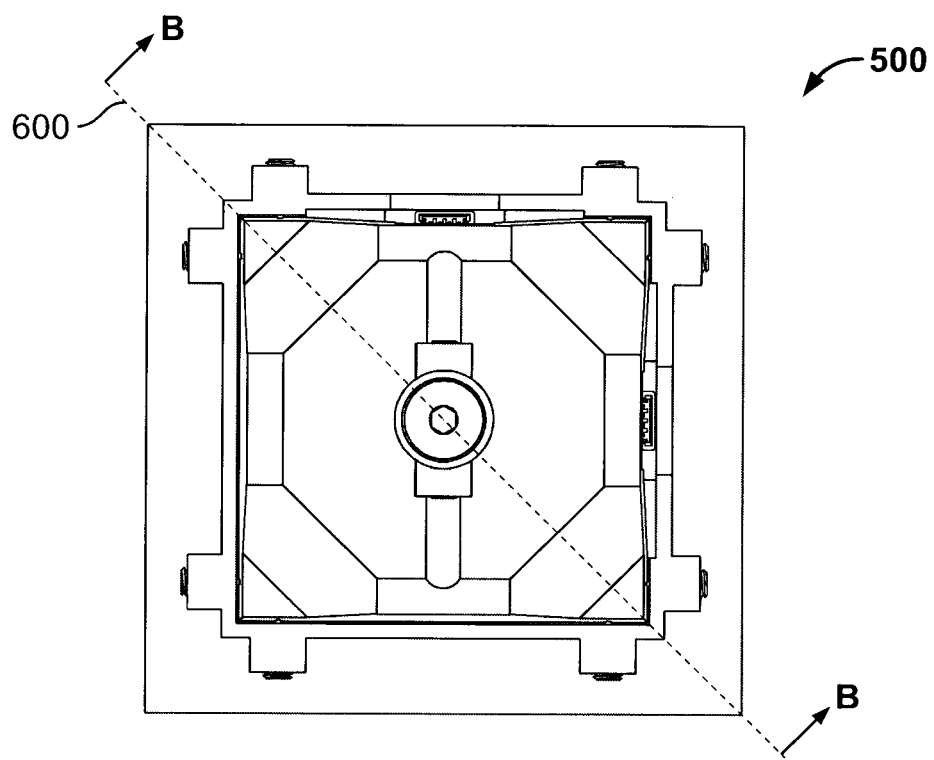
FIG. 6A shows a top view of the suspension apparatus cut by a plane B-B.
Figure 6B:
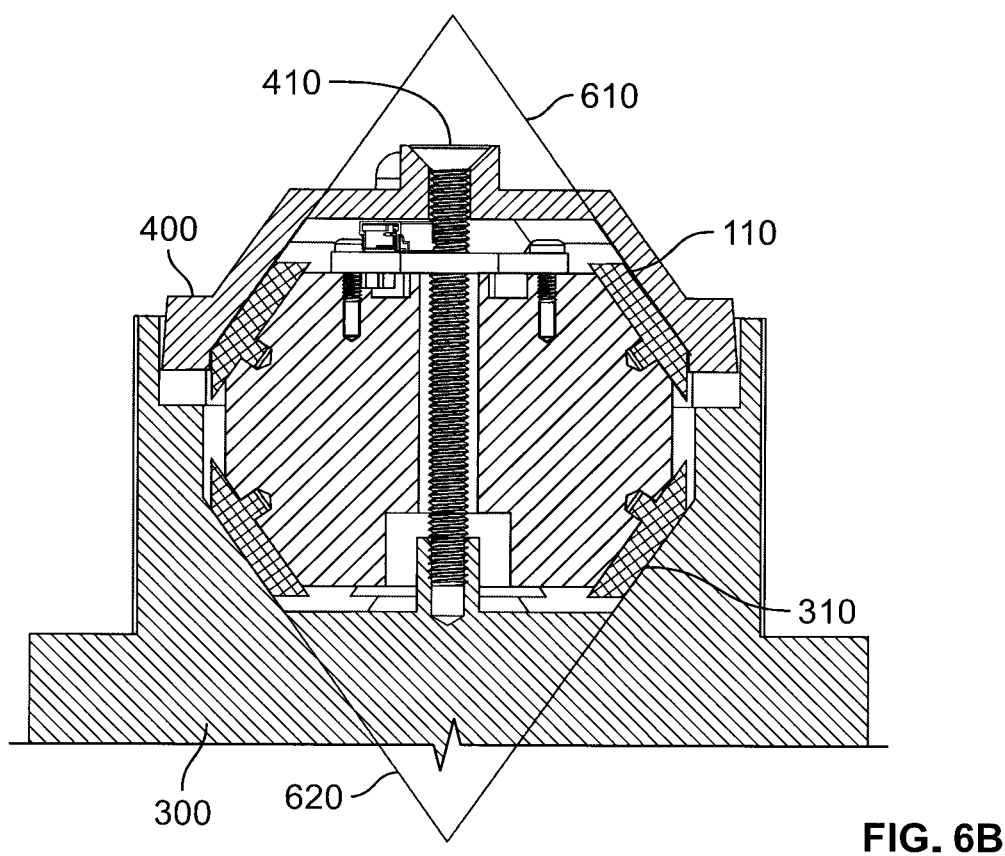
FIG. 6B shows an internal section of the suspension apparatus along the plane B-B.

FIG. 6A shows a top view of the suspension apparatus 500 cut by a plane B-B 600. FIG. 6B shows an internal section of the suspension apparatus 500 along the plane B-B 600. As shown in FIG. 6B, top and bottom flanges formed by the insertions 110 form corresponding top and bottom pyramid wedges 610 and 620. Wedges 610 and 620 transform the force of coupling screw 410 into a pressure that compresses the elastomer insertions 110. In particular, the vertical force of the coupling screw 410 is transferred into a clamping pressure on the top and bottom wedges 610 and 620 that compresses the elastomer insertions 110. When coupling screw 410 is tightened, the counterparts of the lid 400 compress the top wedge 610 formed by the upper elastomer insertions 110 and the bottom wedge and the bottom wedge 620 formed by the lower elastomer insertions 110 are compressed against the counterparts 310 of the pocket 300. The resonance frequency of the suspension is proportional to the pressure compressing the elastomer insertions 110, the pressure is proportional to the force of the coupling screw 410, and the force of the coupling screw 410 is proportional to the torque moment 420 which is controlled to be a desired value when the coupling screw 410 is tightened. Accordingly, the torque moment 420 of coupling screw 410 defines the suspension's resonance frequency. In this way, all gaps related to tolerances, manufacturing non-idealities of components of the suspension apparatus 500 are taken up, the necessary spring factor is provided, and hence, the target amplitude-frequency response (AFR) needed to suppress vibration and shock impacts is achieved.

It can be noted that manufacturing tolerances for elastomer parts are considerably greater than that of metal parts. This is due to the physical nature of the elastomer, technology related to manufacturing the elastomer, and curing and shrinkage of the elastomer. However, the arrangement of the elastomer insertions 110 to form the wedges 610 and 620, according to an advantageous embodiment of the present invention, solves the problems that may arise due to the manufacturing tolerances of the elastomer parts.

Figure 7:
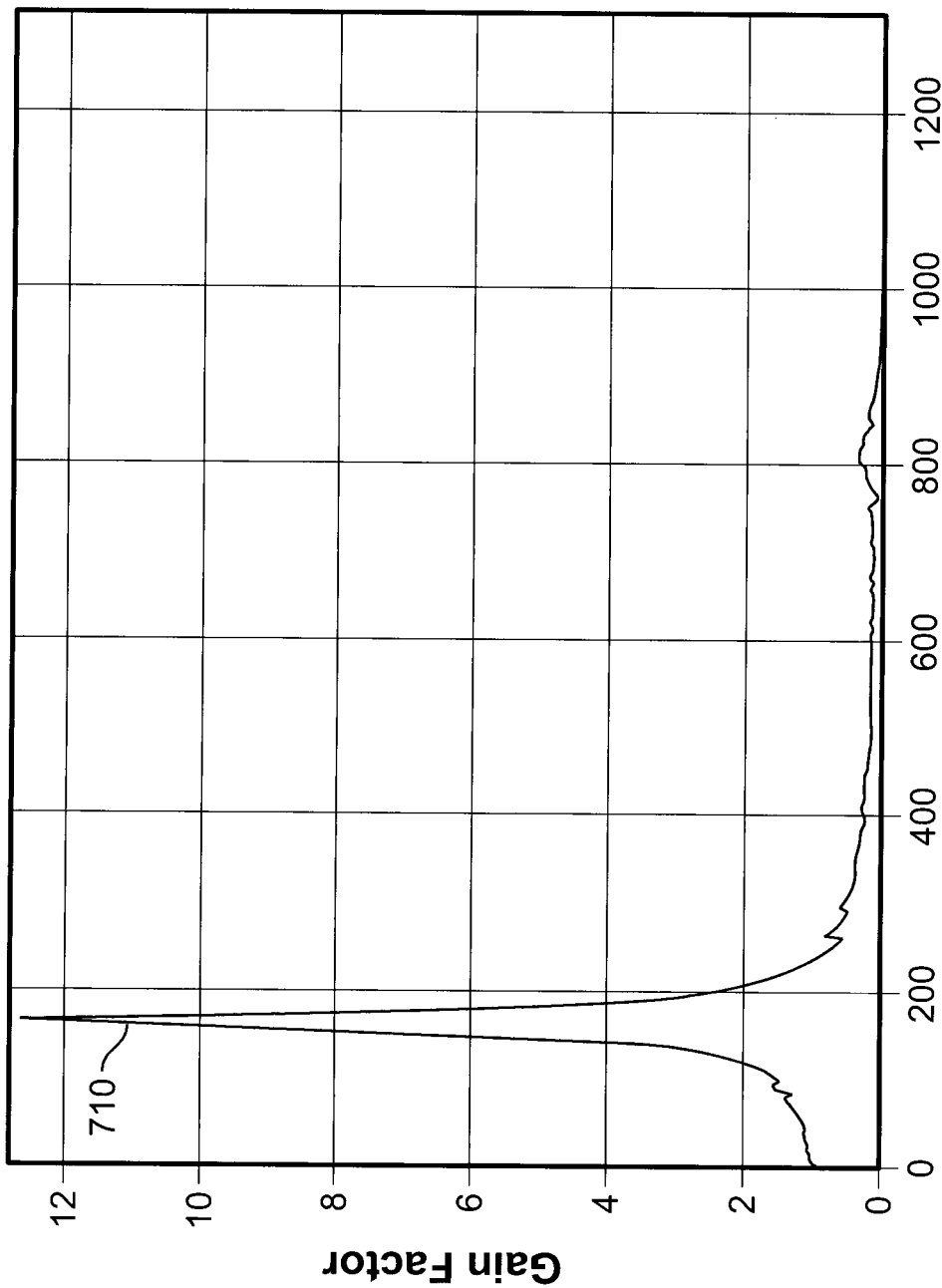
FIG. 7 illustrates an example of an amplitude-frequency response (AFR) the suspension apparatus according to an embodiment of the present invention.

FIG. 7 illustrates an example of an amplitude-frequency response (AFR) the suspension apparatus 500 according to an embodiment of the present invention. As shown in FIG. 7, the AFR of the suspension apparatus 500 should have a gain factor of one for low frequencies where the useful signal is present. The useful signal refers to the object acceleration and/or angular rate measured by the inertial sensors. Due to the gain equal to one for low frequencies, there is no deterioration or amplification of the useful signal and the accuracy of the measurements of the inertial sensors is preserved. At higher frequencies, there is a resonance peak 710 and then attenuation of the gain factor almost to zero, which eliminates any effects of shock and vibration impacts on the measurements by the inertial sensors. The frequency at which the resonance peak 710 is reached is the resonance frequency. The closer the AFR is to zero in frequencies above the resonance frequency, the better.

The resonance frequency is a parameter of the AFR, and should be fixed. To maximize attenuation in the field of high frequencies (above the resonance frequency), the resonance frequency should be as small as possible, but the resonance peak 710 should not be in the low frequency area in which the desired signal is present, so as not to deteriorate or amplify the desired signal. In addition, the resonance frequency is to be high enough to prevent natural vibrations produced by the construction machine's engine, transmission, and chassis from being in the resonance peak 710 area, and also to prevent suction of external energy and hence permanent oscillation of the core 100. For most construction machines the frequency spectrum of natural vibration has a range of 0 . . . 100 Hz so a resonance frequency within the range of 150-200 Hz meets such requirements. In this case, the suspension apparatus 500 will transfer dangerous impact energy from the area of frequencies of 1 kHz to a safe range of 150-200 Hz and dissipate this energy there. In order to transfer dangerous high-frequency impact energy to the safe range, the wedges 610 and 620 formed by the elastomer insertions 110 act as a spring to produce oscillations in the safe range due to the impact energy and act as a damper to attenuate those oscillations. Behavior of oscillations in the safe range is defined by the Q-factor. In this case, the Q-factor is the amplitude of the AFR at the resonance peak 710. The greater the value of the Q-factor, the better the dissipation of energy in the safe range and stronger the attenuation in the area of 1 kHz. The Q-factor should be as large as possible. For example, in exemplary embodiments of the present invention, the Q-factor is 10 or greater and mostly defined by elastomer physical properties. Both already mentioned latex and silicone rubbers are examples of materials which provide good Q factor.

At the output of each inertial sensor there is an analog electric narrowband low pass filter with typical bandwidth of 10 . . . 20 Hz. The filter rejects electrical noise and provides a narrowband spectrum for further digitization (discretization and quantization) in ADC. The same filter prevents a resonance peak 710 from affecting sensor measurements. Accordingly, when the suspension apparatus 500 dampens vibrations to transfer high-frequency impact energies to the resonance frequency (or a safe resonance frequency range), the electric filter prevents the oscillations of the suspension apparatus from affecting the sensor measurements. It is important to control the position of the resonance peak 710 relative to the frequencies of the construction machine's vibrations, as described above. That is, the position of the resonance peak 710 should be set so as to prevent vibrations produced by the construction machine's engine, transmission, and chassis from being in the resonance peak 710 area. The electrical filter protects the desired signal from the inertial sensors from short-term effects, but is inefficient when powerful periodic vibrations are prevalent. So in exemplary embodiment, a resonance frequency within the range of 150-200 Hz may be used to avoid amplification of natural vibration by resonance peak area and passing them to sensor output.

The following equation shows a dependence of the resonance frequency $f_0$ of peak 710 on the mass M of the core 100 and the total spring factor K of the suspension apparatus 500:

$$f_0 = \frac{1}{2\pi}\sqrt{\frac{K}{M}}$$

Accordingly, given the mass M of the core 100 and the target resonance frequency $f_0$ for the AFR of the suspension apparatus 500, a target total spring factor K of the suspension apparatus 500 is calculated using the above expression. A value of the torque moment 420 of coupling screw 410 is determined that will result in the calculated target total spring factor K, and the tightening of coupling screw 410 is controlled by a torque screw driver to apply the torque moment 420 of the determined value. The dependency of the spring factor K from the torque moment 420 cannot be shown with a simple analytic equation because of the difficulty in modeling elastomer properties. Accordingly, the torque moment 420 necessary to achieve desired resonance frequency $f_0$ can be chosen experimentally by testing the suspension system on a laboratory vibration table. The torque is incrementally changed and each swing time AFR, such as the AFR shown FIG. 7, is measured and its peak frequency is compared with desired value. The greater the mass M in the denominator of the above equation, the less the total spring factor variation $\Delta K$ will affect variation $\Delta f$ of the resonance frequency $f_0$, since $\Delta K$ is divided by M:

$$f_0 + \Delta f = \frac{1}{2\pi}\sqrt{\frac{K+\Delta K}{M}} \approx \frac{1}{2\pi}\sqrt{\frac{K}{M}} + \frac{\Delta K}{4\pi\sqrt{K \cdot M}}$$

Moreover, the requirements to sustaining the accuracy of the total spring factor K of the suspension apparatus 500 and adjustment accuracy (mostly adjustment of moment $M_Z$ 420) of the suspension apparatus 500 at the manufacturing floor are also reduced. Maximal mass M of the core 100 reduces the requirements to absolute value of the spring factor of the elastomer insertions 110 which typically cannot be very low due to the technological process of elastomer manufacture as well. This is because frequency $f_0$ is proportional to ratio between K and M. The more M the more K will be acceptable for the same $f_0$. In order to achieve maximal mass M of the core 100, the core may be made from a high density material, such as stainless steel, brass, or bronze, as described above. Due to the advantageous of maximal mass M of the core 100, the dimensions of the core 100 can be defined by permissible internal sizes of the whole apparatus 500.

Figure 8:
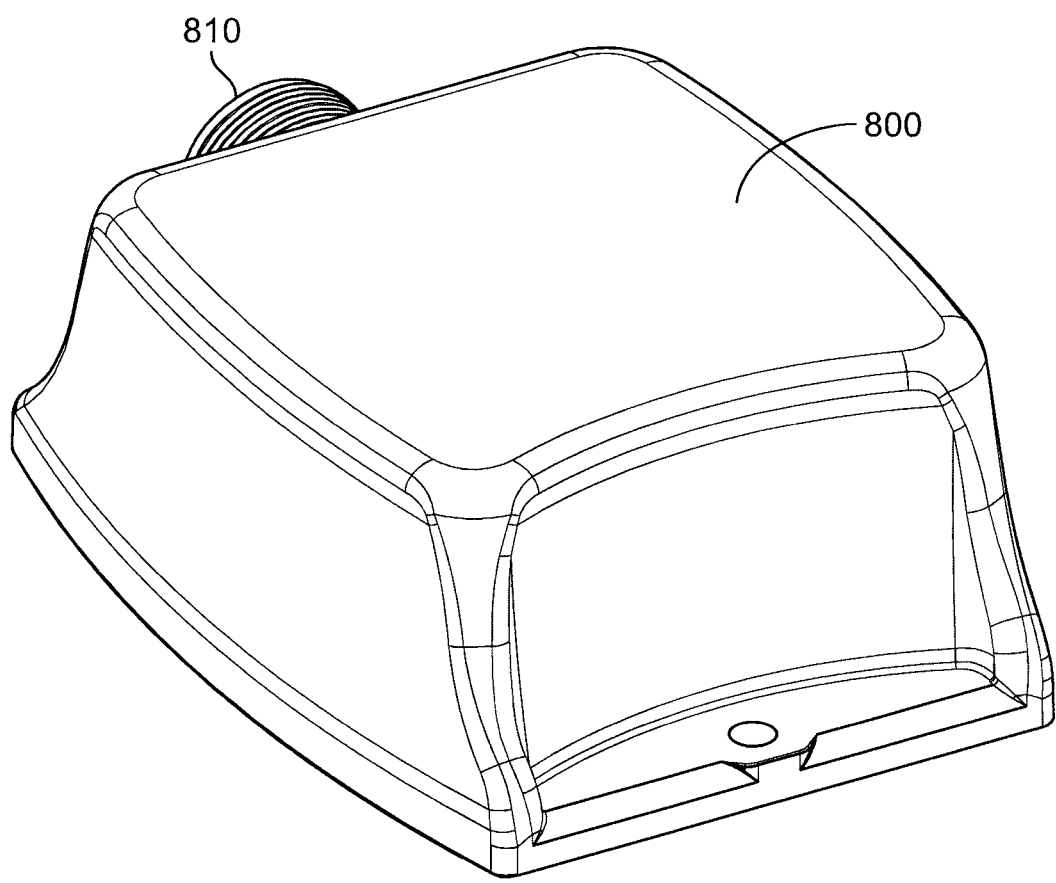
FIG. 8 illustrates an example of external view of an inertial measurement unit housing with the suspension apparatus inside.

FIG. 8 illustrates an example of external view of an inertial measurement unit (IMU) housing with the suspension apparatus 500 inside. As shown in FIG. 8, the IMU has a housing 800, usually made from die casted aluminum alloy, and electrical connector 810 that provides a cable connection to read inertial data measured by the inertial sensors.

The IMU 800 is mounted on a construction machine, such as a bulldozer, grader, asphalt or concrete paver, excavator, etc. The inertial sensors measure acceleration and/or angular rate of an operative organ (e.g., blade, bucket, etc.) of the construction machine. The inertial sensors can be used in coupling with other sensors, such as GNSS, laser sensors, supersonic sensors, etc., to track a height or position of the operative organ of the construction machine. The measurements of the inertial sensors can be sent as electrical signals to an automated control system of the construction machine. The suspension apparatus 500 prevents shock and vibration impacts on the construction machine from being transferred to the inertial sensors.

Figure 9:
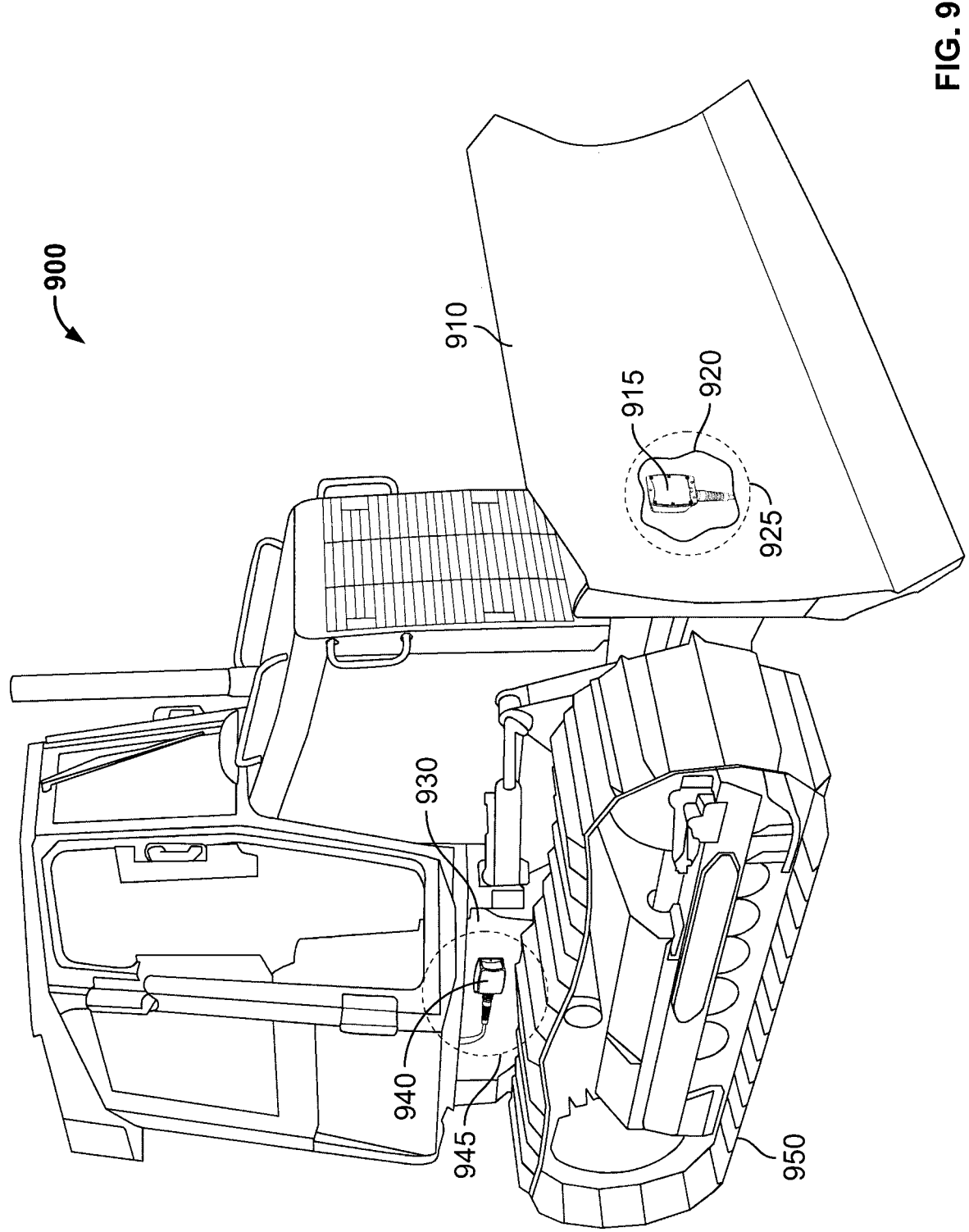
FIG. 9 illustrates an example of mounting the inertial measurement unit on a construction machine according to an embodiment of the present invention.
Figure 10:
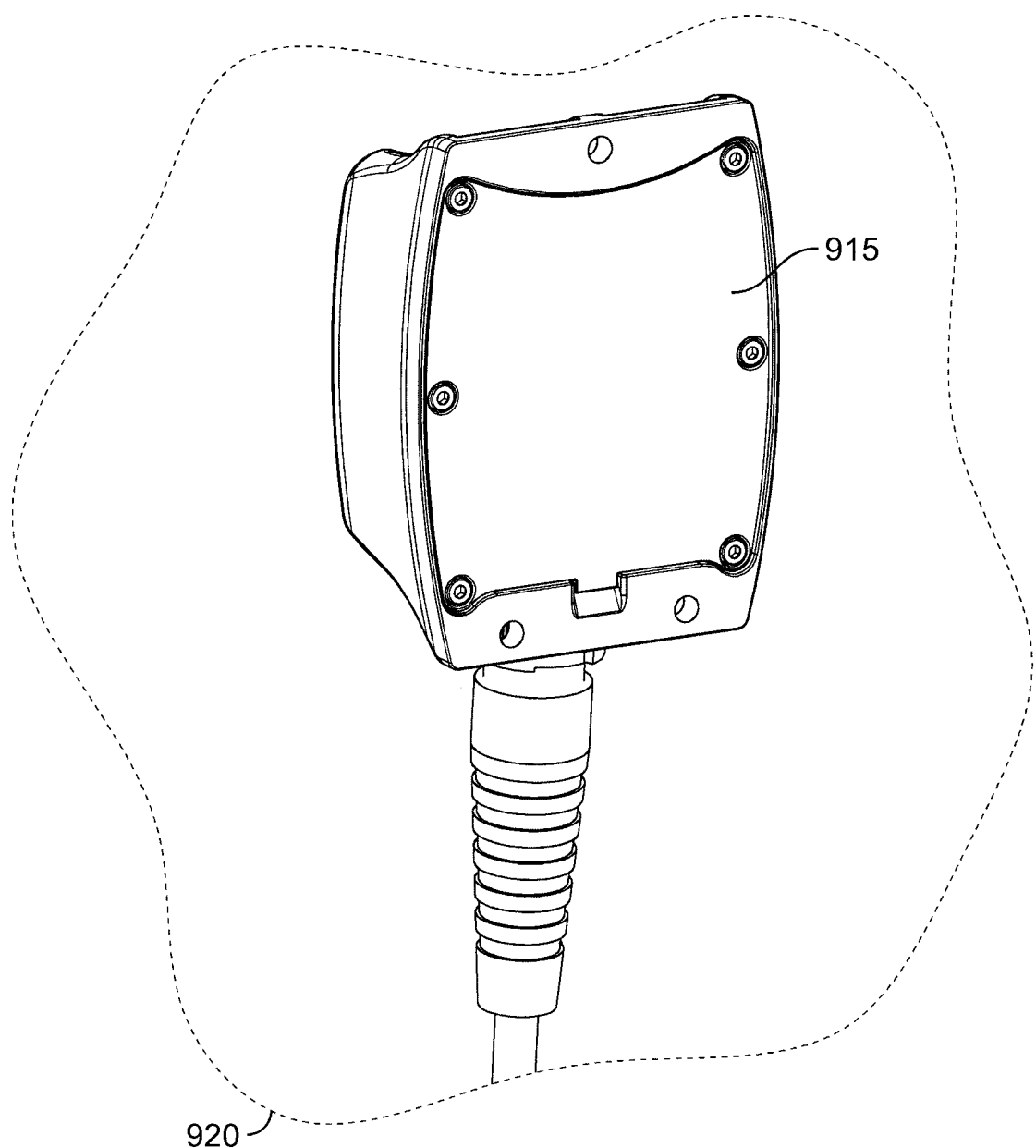
FIG. 10 illustrates zoomed-in view of mounting the inertial measurement unit on a bulldozer blade.
Figure 11:
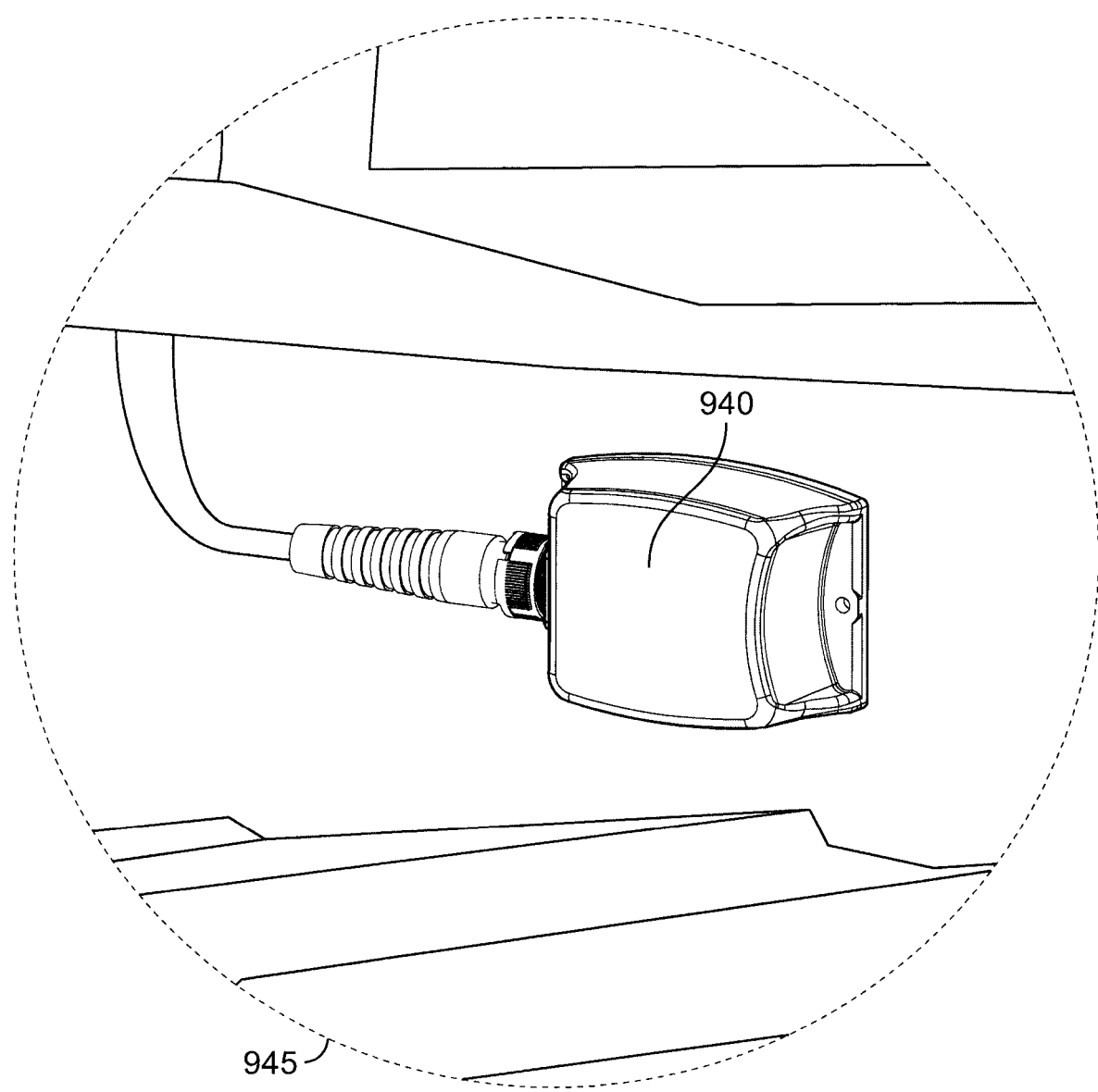
FIG. 11 illustrates zoomed view-in of mounting the inertial measurement unit on a bulldozer body.

FIG. 9 illustrates an example of mounting the inertial measurement unit on a construction machine according to an embodiment of the present invention. In the exemplary embodiment of FIG. 9, the IMU (including the suspension apparatus) is mounted on a bulldozer 900. Bulldozer 900 has two main parts operably coupled to each other: blade 910 and body 930. Blade 910 is placed on front of the machine and used to cut and move construction material. In the exemplary embodiment of FIG. 9, an IMU 915 is mounted on back side of blade 910 shown as scrap view 920. FIG. 10 illustrates a zoomed-in view of the IMU 915 mounted on the bulldozer blade. In particular, FIG. 10 shows a zoomed-in view of area 925 in FIG. 9. In the embodiment of FIG. 9, an additional IMU 940 is mounted on the bulldozer body 930. FIG. 11 illustrates a zoomed view-in of the IMU 940 mounted on the bulldozer body. In particular, FIG. 11 shows a zoomed-in view of area 945 in FIG. 9. These IMUs 915 and 940 allow an automated control system to estimate both blade and body position and altitude if coupled, e.g., with GNSS sensors. Bulldozer 900 has undercarriage 950 consisting of idler, sprocket, rollers and tracks. Moving parts of undercarriage 950 itself and blade 910 due to interaction with ground and rocks during movement, produce high levels of shock and vibration impact, which is attenuated by the suspension apparatus 500.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An inertial sensor suspension apparatus mountable on a construction machine for preventing shock and vibration impacts on the construction machine from being transferred to one or more inertial sensors, comprising:
    a pocket;
    a lid;
    a core disposed in the pocket and covered by the lid;
    one or more inertial sensors attached to the core;
    a plurality of elastomer insertions attached to the core and forming an upper wedge between the core and the lid and a lower wedge between the core and the pocket; and
    a coupler that provides controlled connection of the pocket and the lid to compress the plurality of elastomer insertions using a force corresponding to a target resonance frequency for the inertial sensor suspension apparatus.

2. The inertial sensor suspension apparatus of claim 1, wherein the core is cubic-shaped with pyramidal truncated corners, and the plurality of elastomer insertions comprise a respective elastomer insertion attached to each of the pyramidal truncated corners of the core.

3. The inertial sensor suspension apparatus of claim 1, wherein the core is made of one of stainless steel, brass, or bronze.

4. The inertial sensor suspension apparatus of claim 1, wherein the plurality of elastomer insertions are made of one of latex or silicon rubber.

5. The inertial sensor suspension apparatus of claim 1, wherein the one or more inertial sensors comprise first, second, and third uniaxial inertial sensors attached to first, second, and third orthogonal faces of the core, respectively.

6. The inertial sensor suspension apparatus of claim 1, wherein the coupler comprises a first screw that passes through the core and connect the lid to the pocket and is tightened to a target torque moment corresponding to a compression force on the plurality of elastomer insertions that results in a target total spring factor calculated to provide the target resonance frequency for the inertial sensor suspension apparatus.

7. The inertial sensor suspension apparatus of claim 6, further comprising one or more second screws to lock the first screw at the target torque moment.

8. The inertial sensor suspension apparatus of claim 1, wherein the target resonance frequency for the inertial sensor suspension apparatus is within the range of 150-200 Hz.

9. The inertial sensor suspension apparatus of claim 1, wherein in response to an impact, the upper and lower wedges formed by the plurality of elastomer insertions act as a spring to produce oscillations due to the impact and act as a damper to attenuate those oscillations.

10. The inertial sensor suspension apparatus of claim 9, wherein the upper and lower wedges formed by the plurality of elastomer insertions provide mechanical filtering of vibrations due to impacts and an amplitude frequency response of the inertial sensor suspension apparatus has a gain of one for a range of low frequencies less than the target resonance frequency, a resonance peak at the target resonance frequency, and attenuates high frequencies greater than the target resonance frequency to approximately zero.

11. The inertial sensor suspension apparatus of claim 10, wherein a Q-factor of amplitude frequency response of the inertial sensor suspension apparatus is greater than or equal to 10.

12. A system comprising:
a construction machine having an operative organ;
one or more inertial sensors configured to measure at least one of acceleration or angular rate of the operative organ of the construction machine; and
an inertial sensor suspension apparatus for preventing shock and vibration impacts on the construction machine from being transferred to the one or more inertial sensors, the inertial sensor suspension apparatus comprising:
a pocket,
a lid,
a core disposed in the pocket and covered by the lid, wherein the one or more inertial sensors are attached to the core,
a plurality of elastomer insertions attached to the core and forming an upper wedge between the core and the lid and a lower wedge between the core and the pocket, and
a coupler that provides controlled connection of the pocket and the lid to compress the plurality of elastomer insertions using a force corresponding to a target resonance frequency for the inertial sensor suspension apparatus.

13. The system of claim 12, wherein the core is cubic-shaped with pyramidal truncated corners, and the plurality of elastomer insertions comprise a respective elastomer insertion attached to each of the pyramidal truncated corners of the core.

14. The system of claim 12, wherein the core is made of one of stainless steel, brass, or bronze, and the plurality of elastomer insertions are made of one of latex or silicon rubber.

15. The system of claim 12, wherein the one or more inertial sensors comprise first, second, and third uniaxial inertial sensors attached to first, second, and third orthogonal faces of the core, respectively.

16. The system of claim 12, wherein the coupler comprises a first screw that passes through the core and connect the lid to the pocket and is tightened to a target torque moment corresponding to a compression force on the plurality of elastomer insertions that results in a target total spring factor calculated to provide the target resonance frequency for the inertial sensor suspension apparatus.

17. The system of claim 16, wherein the inertial sensor suspension apparatus further comprise one or more second screws to lock the first screw at the target torque moment.

18. The system of claim 12, wherein the target resonance frequency for the inertial sensor suspension apparatus is within the range of 150-200 Hz.

19. The system of claim 12, wherein in response to an impact on the construction machine, the upper and lower wedges formed by the plurality of elastomer insertions act as a spring to produce oscillations due to the impact and act as a damper to attenuate those oscillations.

20. The system of claim 19, wherein the upper and lower wedges formed by the plurality of elastomer insertions provide mechanical filtering of vibrations due to impacts and an amplitude frequency response of the inertial sensor suspension apparatus has a gain of one for a range of low frequencies less than the target resonance frequency, a resonance peak at the target resonance frequency, and attenuates high frequencies greater than the target resonance frequency to approximately zero.

* * * * *

UNITED STATES PATENT AND TRADEMARK OFFICE
CERTIFICATE OF CORRECTION

PATENT NO. : 10,648,530 B2
APPLICATION NO. : 16/497871
DATED : May 12, 2020
INVENTOR(S) : Alexey Vladislavovich Zhdanov et al.

It is certified that error appears in the above-identified patent and that said Letters Patent is hereby corrected as shown below:

On the Title Page

Column 1, item (72), Inventor name "Sergey VIktorovich ROGACHKOV" should read
--Sergey Viktorovich ROGACHKOV--.

Signed and Sealed this
Eleventh Day of August, 2020

Andrei Iancu
*Director of the United States Patent and Trademark Office*